(12) United States Patent
Ito

(10) Patent No.: US 10,632,473 B2
(45) Date of Patent: Apr. 28, 2020

(54) GRANULATOR

(71) Applicant: KABUSHIKI KAISHA HARMO, Kamiina-gun, Nagano (JP)

(72) Inventor: Osamu Ito, Kamiina-gun (JP)

(73) Assignee: KABUSHIKI KAISHA HARMO, Kamiina-Gun, Nagano (JP)

( * ) Notice: Subject to any disclaimer, the term of this patent is extended or adjusted under 35 U.S.C. 154(b) by 427 days.

(21) Appl. No.: 15/539,227

(22) PCT Filed: Dec. 24, 2015

(86) PCT No.: PCT/JP2015/089510
§ 371 (c)(1),
(2) Date: Jun. 23, 2017

(87) PCT Pub. No.: WO2016/104550
PCT Pub. Date: Jun. 30, 2016

(65) Prior Publication Data
US 2018/0085759 A1 Mar. 29, 2018

(30) Foreign Application Priority Data

Dec. 26, 2014 (JP) ................................. 2014-266178

(51) Int. Cl.
*B02C 18/18* (2006.01)
*B02C 18/14* (2006.01)
*B29B 17/04* (2006.01)

(52) U.S. Cl.
CPC .......... *B02C 18/186* (2013.01); *B02C 18/148* (2013.01); *B02C 18/18* (2013.01);
(Continued)

(58) Field of Classification Search
CPC ................ B02C 18/186; B02C 18/148; B02C 2018/188; B02C 2201/04;
(Continued)

(56) References Cited

U.S. PATENT DOCUMENTS 5,226,607 A * 7/1993 Karg ...................... B02C 18/144
241/166
5,484,112 A * 1/1996 Koenig ................. B02C 18/142
241/236
(Continued)

FOREIGN PATENT DOCUMENTS

JP        4-256450 A    9/1992
JP        3098658 B2   10/2000
(Continued)

OTHER PUBLICATIONS

International Search Report, issued in PCT/JP2015/085910 (PCT/ISA/210), dated Mar. 29, 2016.
(Continued)

*Primary Examiner* — Adam J Eiseman
*Assistant Examiner* — Bobby Yeonjin Kim
(74) *Attorney, Agent, or Firm* — Birch, Stewart, Kolasch & Birch, LLP

(57) ABSTRACT

A granulator includes a rotary crushing blade for crushing an object to be processed that has been fed into a main body. A stationary granulating blade includes a plurality of small shearing blades below the rotary crushing blade. A movable granulating blade includes a plurality of shearing blades below the rotary crushing blade. The granulator includes an oscillating shaft pivotably supporting the movable granulating blade so as to be oscillatable in directions in which the movable granulating blade moves toward or away from the stationary granulating blade. A driving mechanism is provided for oscillating the oscillating shaft, in which the movable granulating blade is detachably fixed to a movable blade holder and the movable blade holder is detachably fixed to the oscillating shaft.

11 Claims, 13 Drawing Sheets

(52) U.S. Cl.
CPC .... *B29B 17/0412* (2013.01); *B02C 2018/147* (2013.01); *B02C 2018/188* (2013.01); *Y02W 30/625* (2015.05)

(58) Field of Classification Search
CPC ............ B02C 2018/147; B02C 18/142; B02C 18/144; B02C 18/18; B02C 18/145; B29B 17/0412
See application file for complete search history.

(56) References Cited

U.S. PATENT DOCUMENTS

| | | | | |
|---|---|---|---|---|
| 5,906,322 | A * | 5/1999 | Hama | B02C 18/02 241/152.2 |
| 2005/0184178 | A1* | 8/2005 | Smidt | B02C 18/18 241/242 |
| 2006/0102762 | A1 | 5/2006 | Garcia et al. | |
| 2007/0251601 | A1* | 11/2007 | Stager | B02C 18/144 144/373 |
| 2008/0066829 | A1* | 3/2008 | Garcia | B27G 13/04 144/172 |
| 2018/0085759 | A1* | 3/2018 | Ito | B02C 18/148 |

FOREIGN PATENT DOCUMENTS

| | | |
|---|---|---|
| JP | 3108384 B2 | 11/2000 |
| JP | 2004-275878 A | 10/2004 |
| TW | 319714 B | 11/1997 |

OTHER PUBLICATIONS

Taiwanese Office Action and Search Report issued in Taiwanese Patent Application No. 104143498, dated May 8, 2019, with English translation.

* cited by examiner

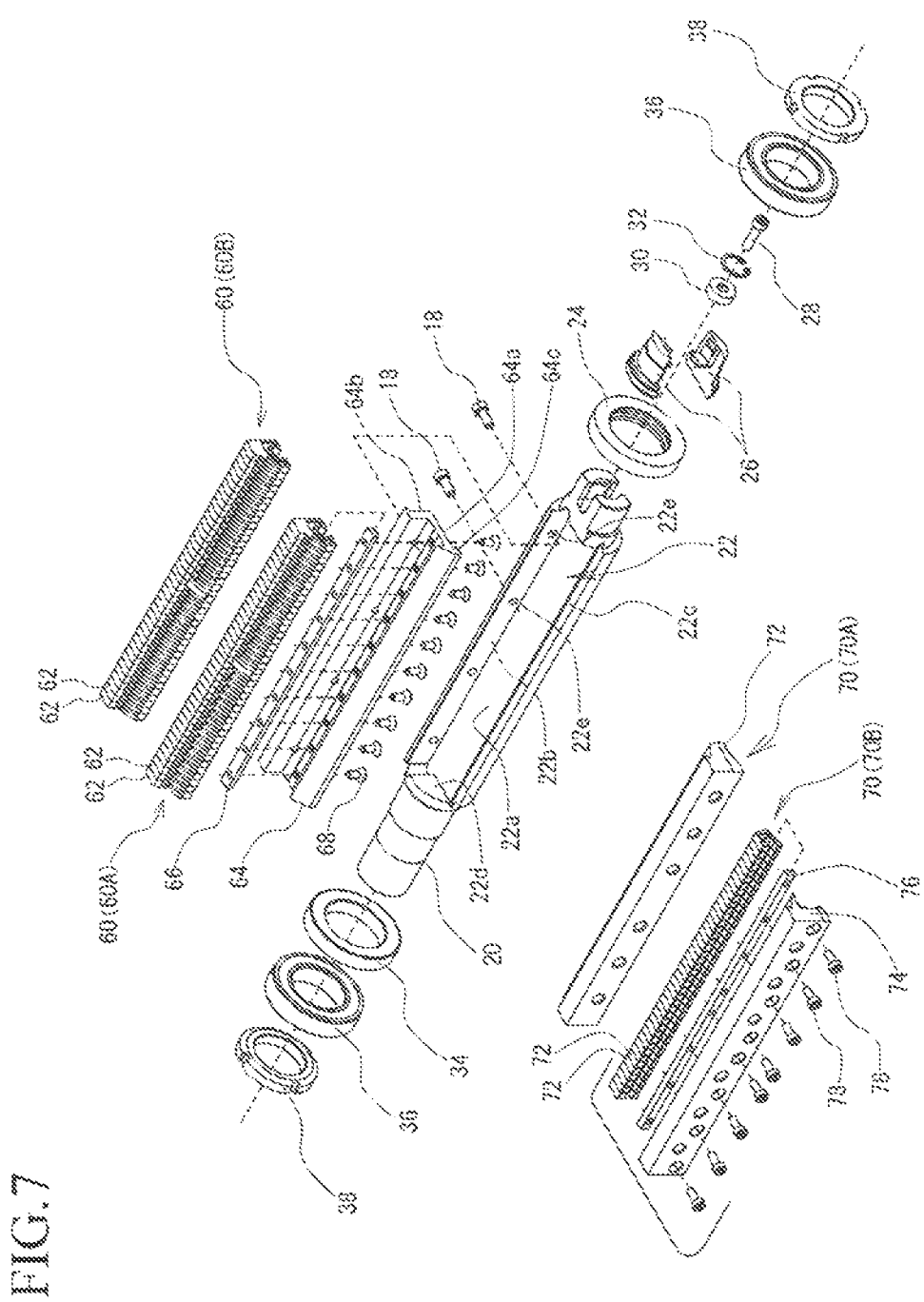

FIG.8A
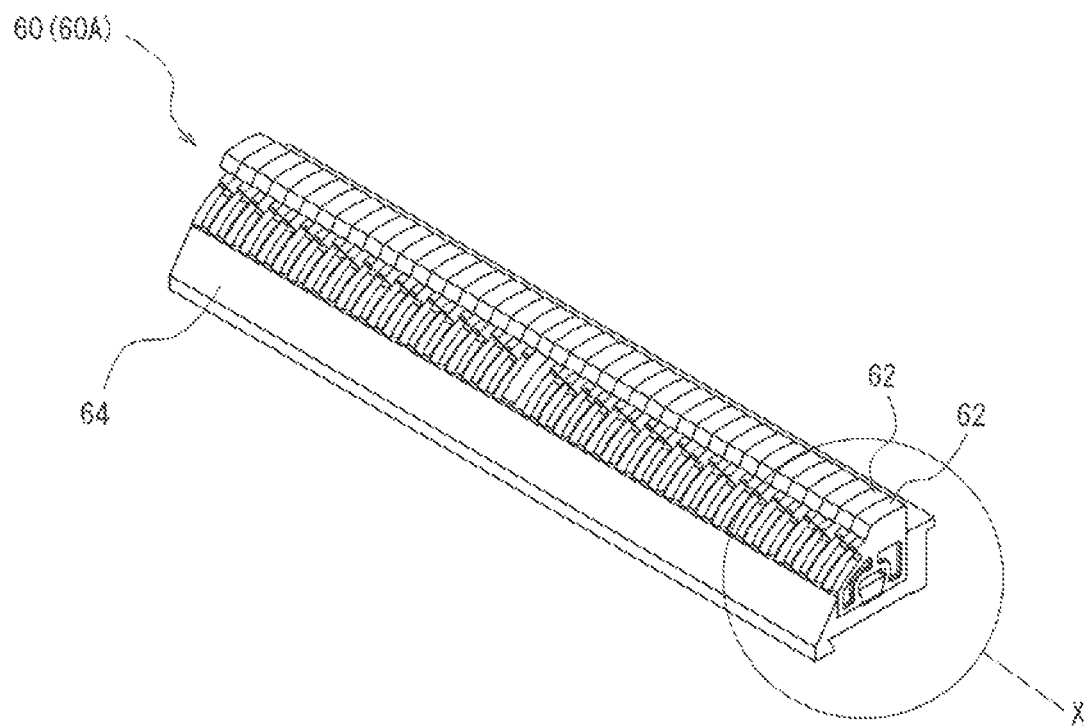
FIG.8B    SECTION X
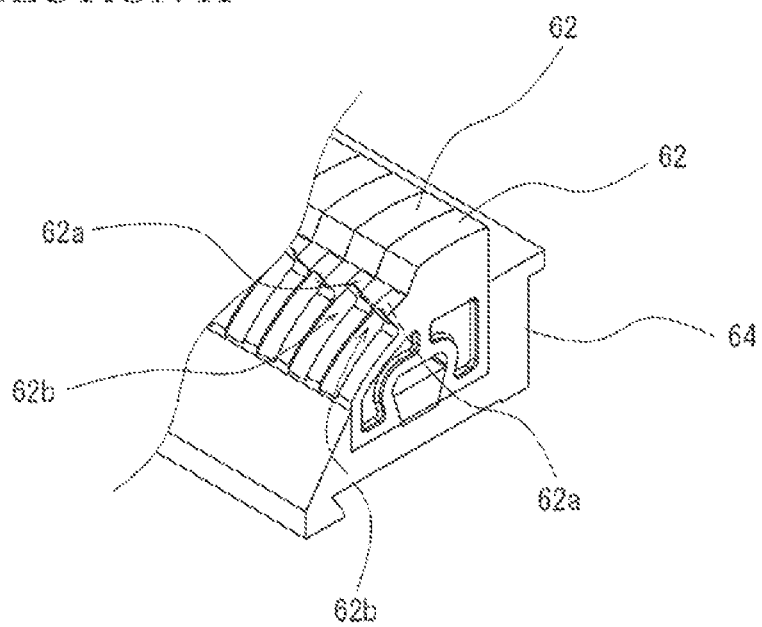

FIG.9A
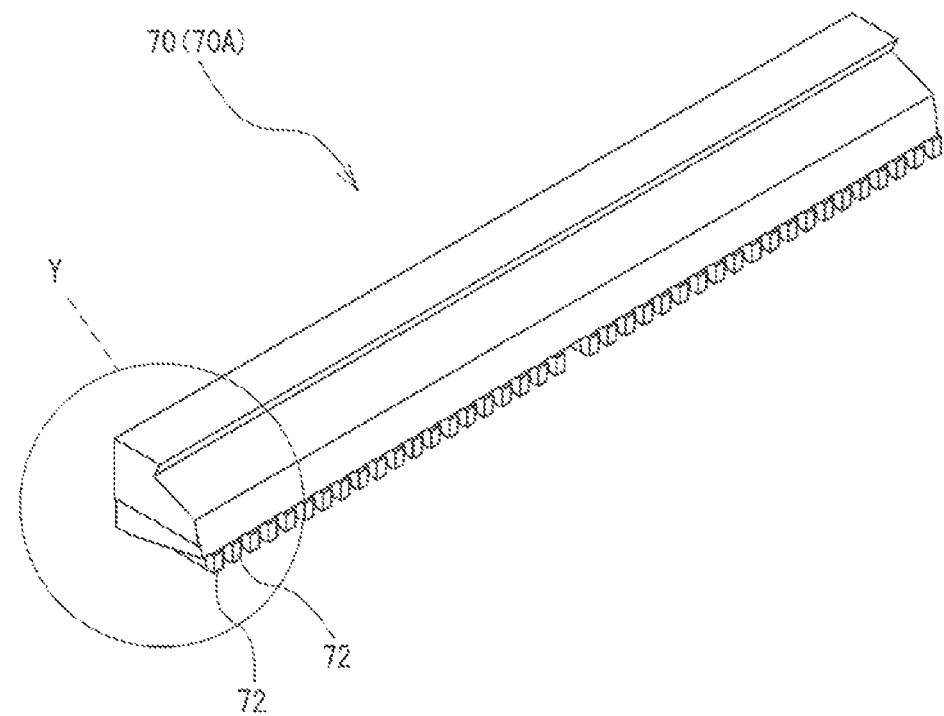
FIG.9B   SECTION Y
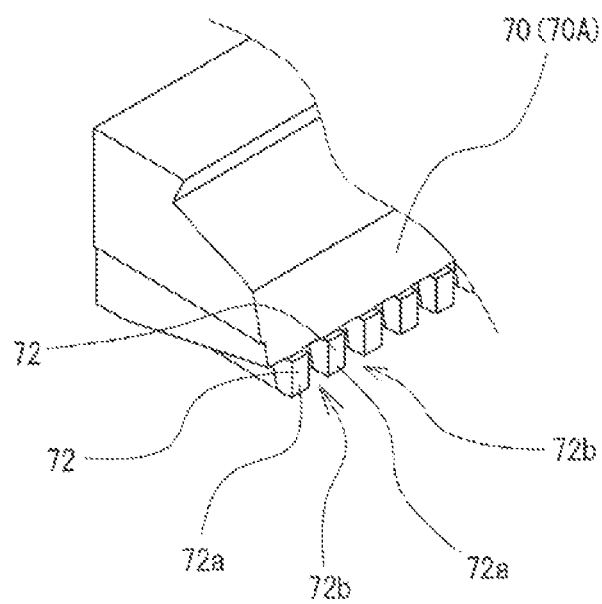

GRANULATOR

TECHNICAL FIELD

The present invention relates to a granulator for granulating, into particles of a predetermined size, resin waste such as a runner, rubber, or the like generated in resin molding such as injection molding.

BACKGROUND ART

The applicant has proposed the granulator for granulating resin waste or the like into particles of the same size so that the granulated resin waste can be preferably reused (see PTL 1 and PTL 2). This granulator is not the conventional resin crush machine that crushes resin using a rotating crush blade, but performs granulating processing by engaging a stationary granulating blade having shearing blades with a movable granulating blade having shearing blades and moving the movable granulating blade toward or away from the stationary granulating blade. Since the size of crashed objects can be made identical, the granulated objects generated by granulating resin material have an advantage in that they can be preferably reused as resin material. Such a method for shearing and granulating an object to be processed as described above is basically different from the method used by conventional resin crush machines.

The structure of the main part of a granulator 100 proposed in PTL 2 is illustrated as an example in FIG. 11 (cross sectional view) and FIG. 12 (exploded perspective view). In these drawings, reference numeral 110 represents a rotary crushing blade provided in a shaft 110a for coarsely crushing an object to be granulated for preparative purposes and reference numeral 112 represents a fixed blade used together with the rotary crushing blade 110 to crush an object to be granulated. The rotary crushing blade 110 is mounted so as to face an opening in a main body 140 and a stationary granulating blade 170 and a movable granulating blade 160 for granulation are disposed in the lower part of the main body 140. The lower part of the main body 140 is gradually narrowed so that the object to be processed that has been coarsely crushed by the rotary crushing blade 110 drops on the engagement part between the stationary granulating blade 170 and the movable granulating blade 160.

A schematic view (assembly diagram) of the movable granulating blade 160 is illustrated in FIG. 13 and a schematic view of the stationary granulating blade 170 is illustrated in FIG. 14. The movable granulating blade 160 is pivotably supported by a shaft 160a so as to be oscillatable like an arc and engages the stationary granulating blade 170. That is, shearing blades 162 of the movable granulating blade 160 and shearing blades 172 of the stationary granulating blade 170 rub against each other on an arc surface.

In the structure described above, the object to be processed that has been fed from the main body 140 is first coarsely crushed by the rotary crushing blade 110 and the fixed blade 112 in the main body 140, drops on the lower part of the main body 140, is granulated by the movable granulating blade 160 and the stationary granulating blade 170, and is exhausted from an exhaust hole 156a provided in a bottom plate 156 of the main body 140.

CITATION LIST

Patent Literature

PTL 1: Japanese Patent No. 3098658
PTL 2: Japanese Patent No. 3108384

SUMMARY OF INVENTION

Technical Problem

By the way, in granulating processing by the granulator, when a metal material is erroneously included in the resin material, which is an object to be processed, and the shearing blades of the granulating blades (stationary granulating blade and movable granulating blade) are chipped or when the replacement period has been reached due to a lapse of the durable period, the granulating blades need to be replaced. However, in the granulator 100 illustrated in PTL 2, it is necessary to disassemble the main body and remove the oscillating shaft in order to particularly replace the movable granulating blade, as illustrated in FIG. 12. Therefore, replacement work is complicated and very troublesome and the down time of the device (granulator) becomes long.

The invention addresses the above problems with the object of providing a granulator in which a movable granulating blade can be replaced very easily in a short time.

Solution to Problem

As an embodiment, the above problems are solved by the solutions disclosed below.

The disclosed granulator includes a rotary crushing blade for crushing an object to be processed that has been fed into a main body, a stationary granulating blade including a plurality of small shearing blades provided in parallel below the rotary crushing blade, and a movable granulating blade including a plurality of shearing blades provided in parallel below the rotary crushing blade, the movable granulating blade granulating the object to be processed having been coarsely crushed by the rotary crushing blade by engaging the stationary granulating blade by reciprocal driving, the granulator including an oscillating shaft pivotably supporting the movable granulating blade so as to be oscillatable in directions in which the movable granulating blade moves toward or away from the stationary granulating blade and a driving mechanism for oscillating the oscillating shaft, in which the movable granulating blade is detachably fixed to a movable blade holder and the movable blade holder is detachably fixed to the oscillating shaft.

Advantageous Effects of Invention

In the granulator according to the disclosure, the movable granulating blade can be replaced without removing the oscillating shaft from the main body. Accordingly, the movable granulating blade can be replaced very easily in a very short time, significantly reducing the down time of the device required for replacement.

BRIEF DESCRIPTION OF DRAWINGS

FIG. 7 is an assembly diagram (perspective view) illustrating an example of an oscillating shaft and a movable granulating blade of the granulator illustrated in FIG. 1.

FIG. 8 is a schematic view (perspective view) illustrating the movable granulating blade of the granulator illustrated in FIG. 1.

FIG. 9 is a schematic view (perspective view) illustrating an example of a stationary granulating blade of the granulator illustrated in FIG. 1.

DESCRIPTION OF EMBODIMENTS

Figure 1:
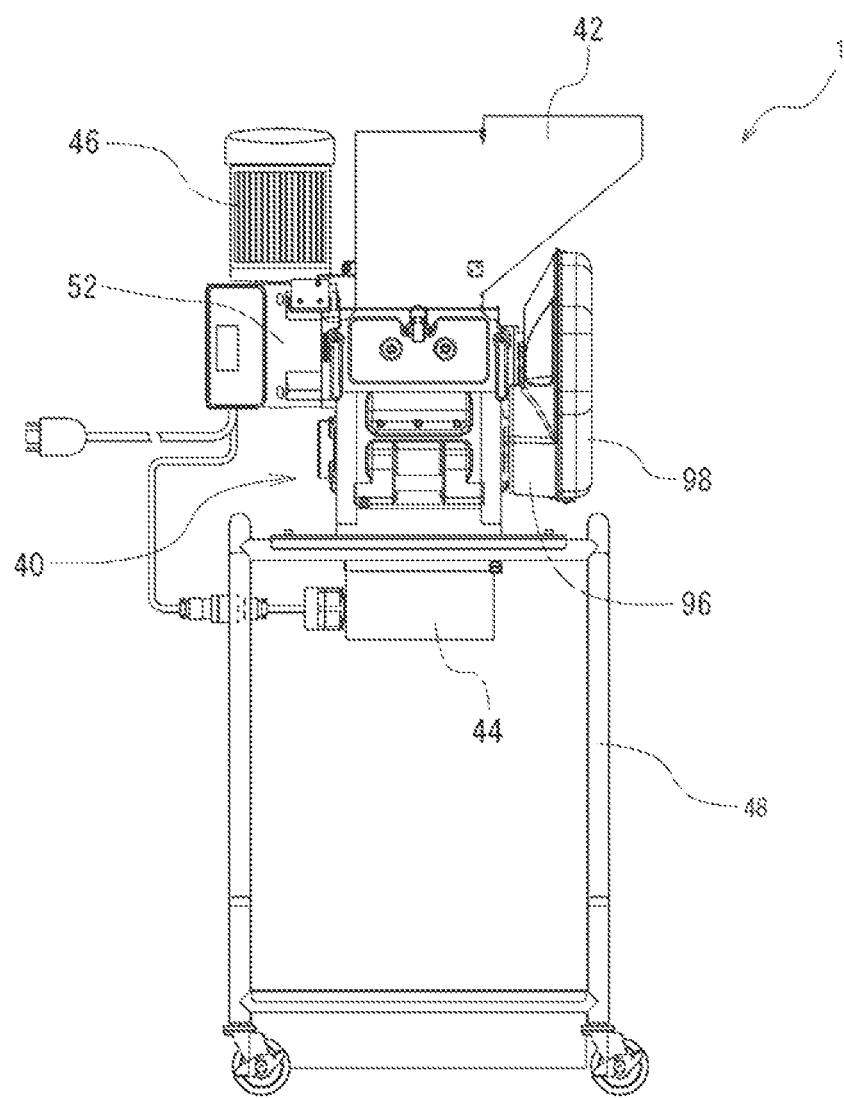
FIG. 1 is a schematic view (front view) illustrating an example of a granulator according to an embodiment of the invention.

An embodiment of the invention will be described below in detail with reference to the drawings. In all drawings for describing the embodiment, components having the same function may be given the same reference numeral to omit repeated descriptions.

FIG. 1 is a schematic view (front view) illustrating the entire shape of a granulator 1 according to the embodiment. Reference numeral 40 represents a main body of the granulator, reference numeral 42 represents a hopper for introducing an object to be processed to the main body 40, and reference numeral 44 represents a shooter attached to the lower part of the main body 40. The object to be processed is fed into the main body 40 from the hopper 42 in the upper part, granulated by the main body 40, and drops downward from the shooter 44. The shooter 44 can be used as a mounting part for a paper bag in which granulated objects are accommodated. Reference numeral 46 represents a driving motor for granulating the object to be processed. Reference numeral 48 represents a support part for supporting the main body 40.

Figure 2:
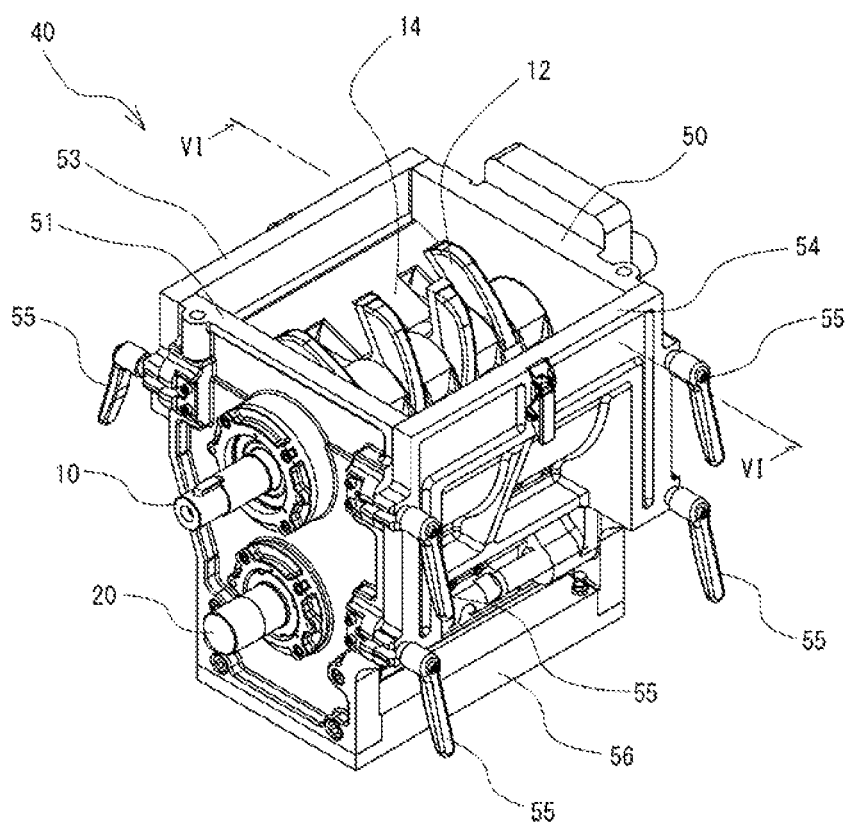
FIG. 2 is a schematic view (perspective view) illustrating an example of a main body of the granulator illustrated in FIG. 1.
Figure 3:
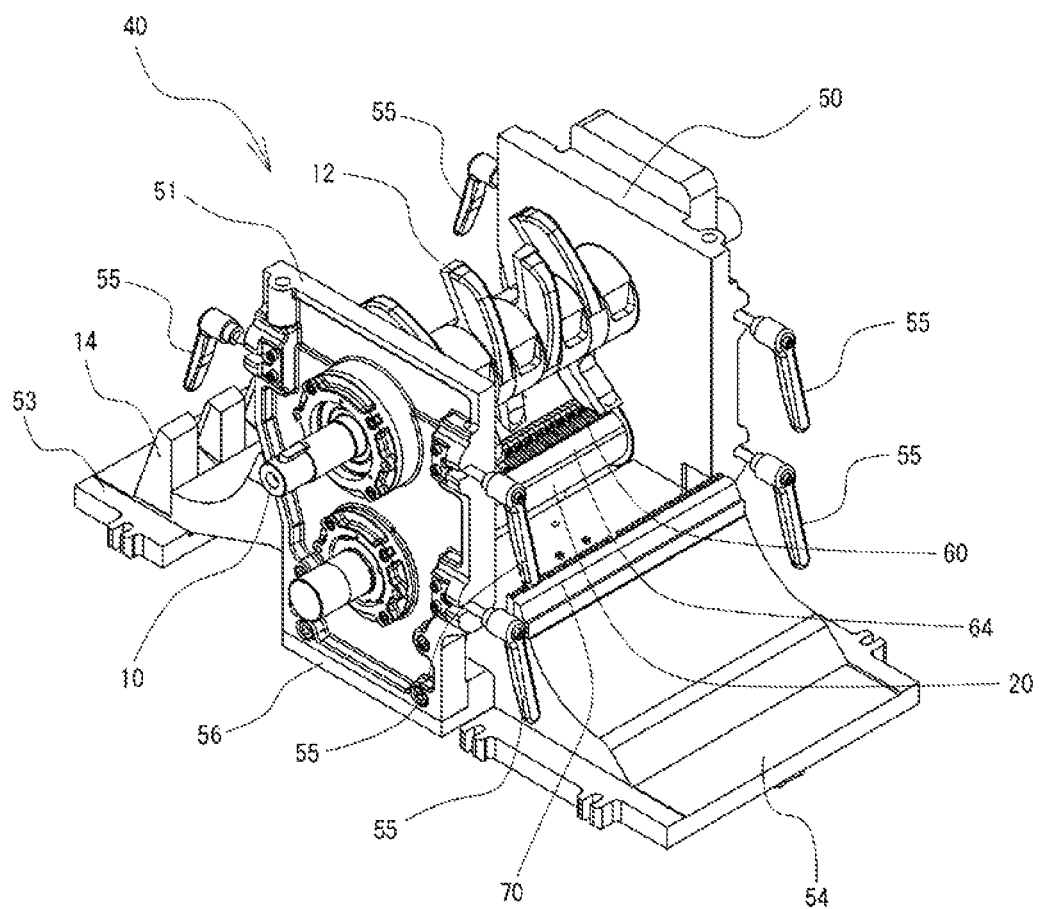
FIG. 3 is a schematic view (perspective view) illustrating the state in which a movable side plate of the main body of the granulator illustrated in FIG. 2 is opened.

FIGS. 2 and 3 illustrate the structure of the main body 40. FIG. 3 illustrates the state in which movable side plates 53 and 54 (described in detail later) of the main body 40 are opened. The main body 40 includes fixed side plates 50 and 51 facing each other and the movable side plates 53 and 54 facing each other as four sides and a bottom plate 56.

As illustrated in FIGS. 2 and 3, the movable side plates 53 and 54 are pivotably supported by the fixed side plate 51 and the fixed side plate 50 via the shafts (not illustrated) provided in the lower end part and mounted so as to be openable and closable. Since the movable side plates 53 and 54 are openable and closable, a movable granulating blade 60 can be replaced, as described later. In addition, this also facilitates maintenance such as the cleaning of the inside of the main body 40 or the observation of the granulation situation of the object to be processed. Reference numeral 55 in the drawing represents a manual knob to which the movable side plates 53 and 54 are mounted. The movable side plates 53 and 54 can be opened and closed as needed by operating the knob 55. In addition, the bottom plate 56 is provided with an exhaust hole 56a (see FIG. 6) through which granulated objects pass.

In the main body 40, a rotary crushing blade 12 and a fixed blade 14 for coarsely crushing an object to be processed for preparative purposes, and granulating blades (movable granulating blade 60 and stationary granulating blade 70 described later) for granulating the object to be processed that has been crushed for preparative purposes are provided. The granulating blades (movable granulating blade 60 and stationary granulating blade 70) are disposed below the rotary crushing blade 12. As illustrated in FIG. 3, the rotary crushing blade 12 has a shaft 10 on which a plurality of small blades are provided. In addition, the movable granulating blade 60 has a plurality of small shearing blades provided linearly on an oscillating shaft 20 in parallel with the shaft line of the oscillating shaft 20.

More specifically, the shaft 10 and the oscillating shaft 20 are provided rotatably about their shafts between one pair of the fixed side surface 50 and the fixed side surface 51 facing each other of the main body 40. The shaft 10 and the oscillating shaft 20 are provided in parallel with each other. The rotary crushing blade 12 is provided on the shaft 10 and the movable granulating blade 60 is provided on the oscillating shaft 20. In addition, one (movable side plate 53) of the other pair of the movable side plates 53 and 54 facing each other is provided with the fixed blade 14 engaging the rotary crushing blade 12 and the other (movable side plate 54) is provided with the stationary granulating blade 70 engaging the movable granulating blade 60.

In this structure, the driving motor 46 rotates the rotary crushing blade 12 and oscillates the movable granulating blade 60 via the conversion mechanism described later. This causes the movable granulating blade 60 pivotably supported by the oscillating shaft 20 to oscillate so as to move toward (in contact with) or away from the stationary granulating blade 70. Accordingly, as in the conventional embodiment, the movable granulating blade 60 engages the stationary granulating blade 70 to granulate the object to be processed (resin material).

Figure 4:
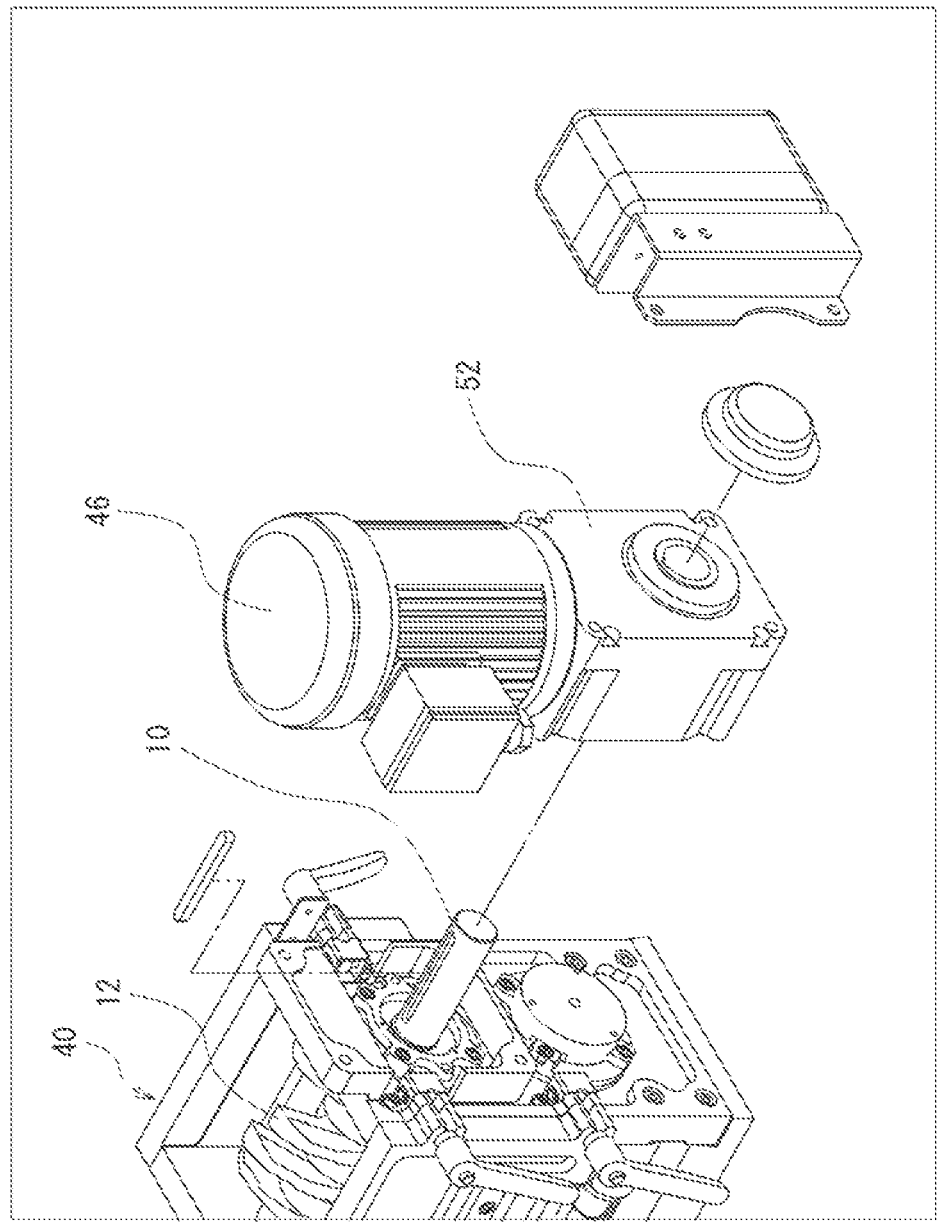
FIG. 4 is an assembly diagram (perspective view) illustrating the mounting structure of the main body and driving motor of the granulator illustrated in FIG. 1.

FIG. 4 illustrates the mechanism for mounting the driving motor 46 to the main body 40. The granulator 1 according to the embodiment drives the rotary crushing blade 12 and the movable granulating blade 60 using one driving motor 46. As illustrated in FIG. 4, the output shaft of the driving motor 46 is coupled to the shaft 10 of the rotary crushing blade 12, the rotary crushing blade 12 is thereby rotated (see arrow A in FIG. 6), and linked to the oscillating shaft 20 of the movable granulating blade 60 via the conversion mechanism (see FIG. 5) to oscillate (see arrow B in FIG. 6) the movable granulating blade 60.

Reference numeral 52 represents a driving motor mounting member, which is provided with a plurality of relay gears, not illustrated, (including, for example, bevel gears and spur gears) therein, and the driving force of the driving shaft of the driving motor 46 is transmitted to the shaft 10 of the rotary crushing blade 12 via the relay gears. This causes the rotary crushing blade 12 to rotate.

Figure 5:
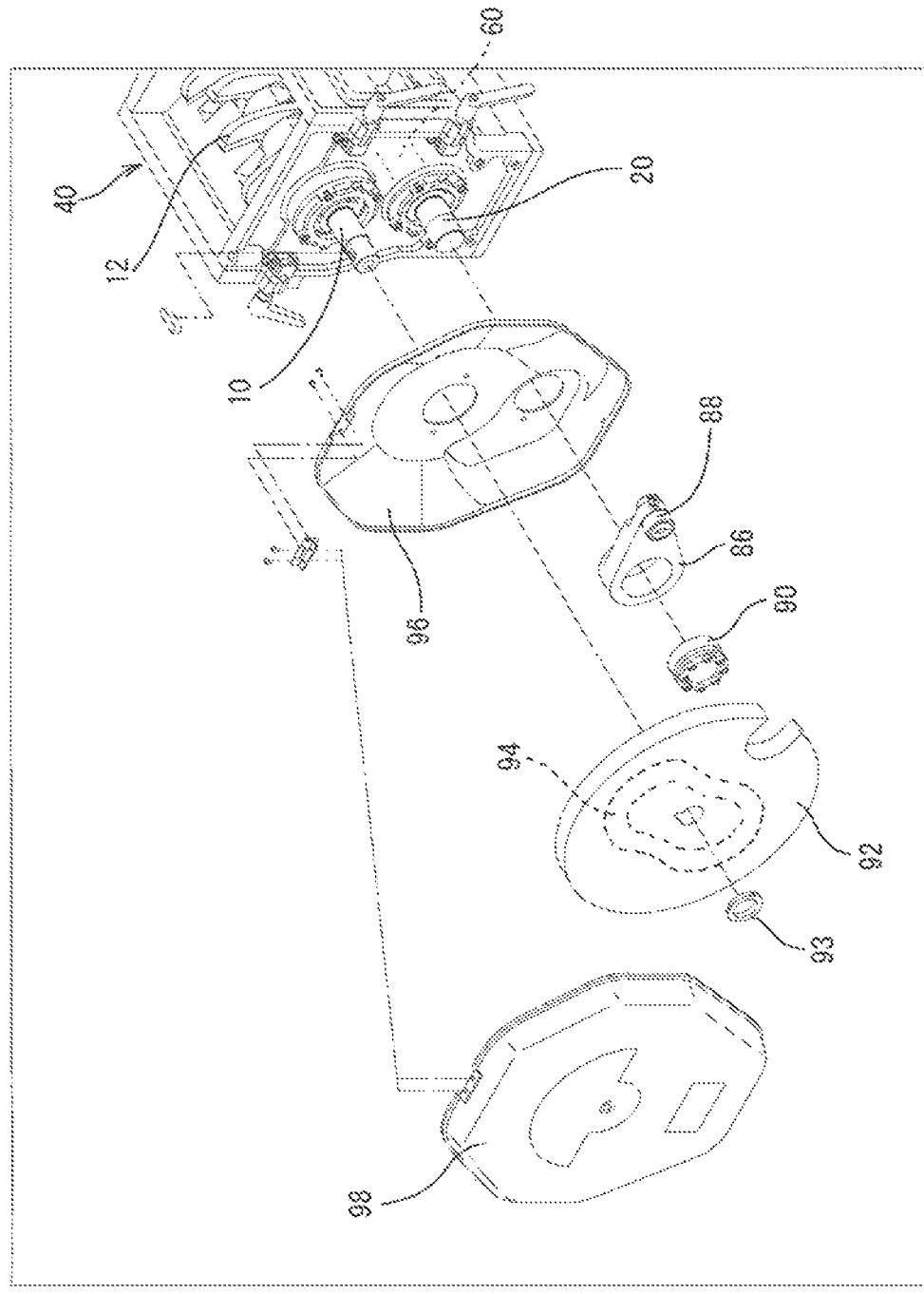
FIG. 5 is an assembly diagram (perspective view) illustrating an example of the conversion mechanism of the granulator illustrated in FIG. 1.

FIG. 5 illustrates a conversion mechanism for converting the rotary motion of the driving motor 46 to the oscillating motion of the oscillating shaft 20 on which the movable granulating blade 60 is provided.

The conversion mechanism according to the embodiment includes a cam member 92 fixed to the shaft 10 of the rotary crushing blade 12 so that its rotation center is aligned with that of the rotary crushing blade 12, an oscillating arm 86 extending from the oscillating shaft 20 of the movable granulating blade 60, and a cam follower 88, provided on the oscillating arm 86, that engages a cam groove 94 of the cam member 92.

More specifically, the cam member 92 is fixed to the shaft 10 of the rotary crushing blade 12 using a fixation member 93. In addition, the oscillating arm 86 is fixed to the oscillating shaft 20 of the movable granulating blade 60 via a fixation member 90 so as to form a predetermined angle. When this predetermined angle is formed, engagement between the stationary granulating blade 70 and the movable granulating blade 60 is made in a predetermined manner by the oscillation of the oscillating arm 86. The cam member 92 and the oscillating arm 86 are covered with a first cover 96 and a second cover 98.

In addition, in FIG. 5, the cam groove 94 is provided in the surface of the cam member 92 close to the main body 40 and the schematic shape of the groove is indicated by the dashed line. Although the cam groove is provided in the embodiment, a cam ridge may be provided and engagement may be made while urging the cam follower (not illustrated). Although the cam follower 88 in the embodiment is a roller-shaped member, the invention is not limited to the embodiment.

In the structure described above, when the driving motor 46 coupled to the rotary shaft 10 of the rotary crushing blade 12 is driven, the rotary shaft 10 rotates, thereby causing the rotary motion of the cam member 92. The rotary motion of the cam member 92 is converted to the oscillating motion of the oscillating arm 86 by the motion (that is, the cam action) of the cam follower 88 engaging the cam groove 94 of the cam member 92. The number of oscillations of the oscillating arm 86 per rotation of the rotary shaft 10 may be set as appropriate (for example, 1 to 5).

In the structure according to the embodiment, unlike the structure disclosed in PTL 1, the eccentric pin, link mechanism, or relay gear does not need to be provided. Accordingly, it is possible to prevent a failure of engagement between the stationary granulating blade 70 and the movable granulating blade 60 caused by the minute space of the link mechanism or the backlash of a gear, thereby achieving highly accurate engagement. Accordingly, since rattles caused by reduction in the engagement accuracy can be prevented for a long period of time, vibrations or noise can be suppressed efficiently and the service life of the device (particularly, the service life of the movable granulating blade 60 and the stationary granulating blade 70) can be improved dramatically.

The driving mechanism (including the driving motor 46, the driving motor mounting member 52, and the conversion mechanism) according to the embodiment converts the output of the driving motor 46 to the oscillating motion of the movable granulating blade 60 and transmits the converted motion. Unlike the movable granulating blade 160 disclosed in PTL 1, the driving mechanism according to the embodiment cannot achieve completely linear reciprocating motion, but significantly simplifies the mechanism for driving the movable granulating blade 60, thereby obtaining an advantage of making the motion of the movable granulating blade 60 very smooth. The device can be made compact easily because the link mechanism is simple and vibrations and noise during operation can be suppressed efficiently because the operation is smooth.

Figure 6:
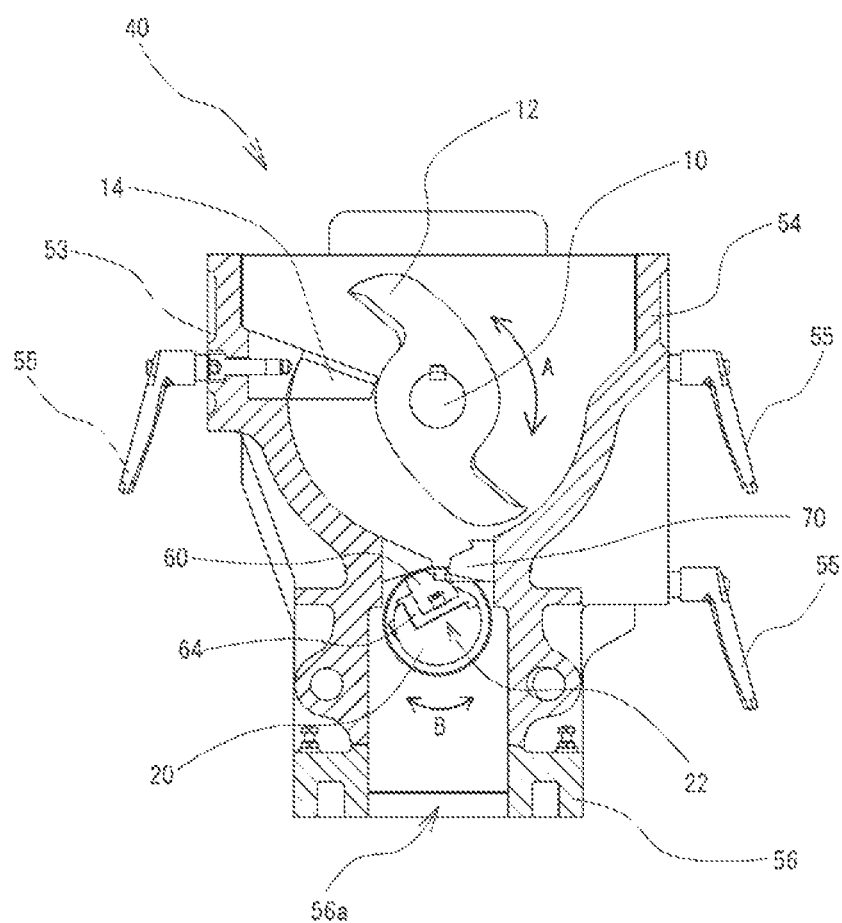
FIG. 6 is a cross sectional view illustrating the main body of the granulator illustrated in FIG. 2 taken along line VI-VI.

Next, the positions of the rotary crushing blade 12, the movable granulating blade 60, the stationary granulating blade 70, and the like in the main body 40 are illustrated in FIG. 6. As described above, the rotary crushing blade 12 is disposed above the movable granulating blade 60 in the main body 40 so that shaft lines of these blades are parallel to each other. In the embodiment, the position in which the blade surface of the rotary crushing blade 12 passes is close to the position in which granulating processing is performed by the movable granulating blade 60 and the stationary granulating blade 70, so that the object to be processed remaining as a result of the granulating processing can be raised again by the rotary crushing blade 12.

In this structure, the object to be processed (resin material) that has been fed into the main body 40 is first crushed coarsely by the rotary crushing blade 12 and the fixed blade 14 in the main body 40, drops to the lower part of the main body 40, is granulated by the movable granulating blade 60 and the stationary granulating blade 70, and drops downward from the exhaust hole 56a opened in the bottom plate 56 of the main body 40. The granulating action by the movable granulating blade 60 and the stationary granulating blade 70 is basically the same as the granulating action described in PTL 2.

The assembly diagram of the movable granulating blade 60 and the stationary granulating blade 70 used in the granulator 1 according to the embodiment is illustrated in FIG. 7. A plurality of types of the movable granulating blades 60 (for example, the movable granulating blades 60A and 60B) having optimum shapes of shearing blades 62 are prepared according to the quality (particularly, the hardness) of the material of the object to be processed (resin material). Similarly, a plurality of types of the stationary granulating blades 70 (for example, the stationary granulating blades 70A and 70B) having optimum shapes of a shearing blade 72 are prepared according to the quality (particularly the hardness) of the material of the object to be processed (resin material). In FIG. 7, they are illustrated together.

The structure of the movable granulating blade 60A is illustrated in FIG. 8A as an example of the movable granulating blade and an enlarged view of section X is illustrated in FIG. 8B. In addition, the structure of the stationary granulating blade 70A is illustrated in FIG. 9A as an example of the stationary granulating blade and enlarged view of section Y is illustrated in FIG. 9B.

In the movable granulating blade 60, as the movable granulating blade 60A illustrated in FIGS. 7, 8A, and 8B, the shearing blades 62 provided in parallel are formed as separate bodies and are fixed to a movable blade holder 64 via bolts 68 using a chip holder 66. In addition, the movable blade holder 64 to which the movable granulating blade 60 has been fixed is detachably fixed to a holder mounting part 22 provided in the oscillating shaft 20 (described in detail later). As in the conventional embodiment, the shape, the projection position, and the like of blade edge parts 62a of the shearing blades 62 are appropriately set according to the quality of the material of an object to be processed (resin material).

Figure 10:
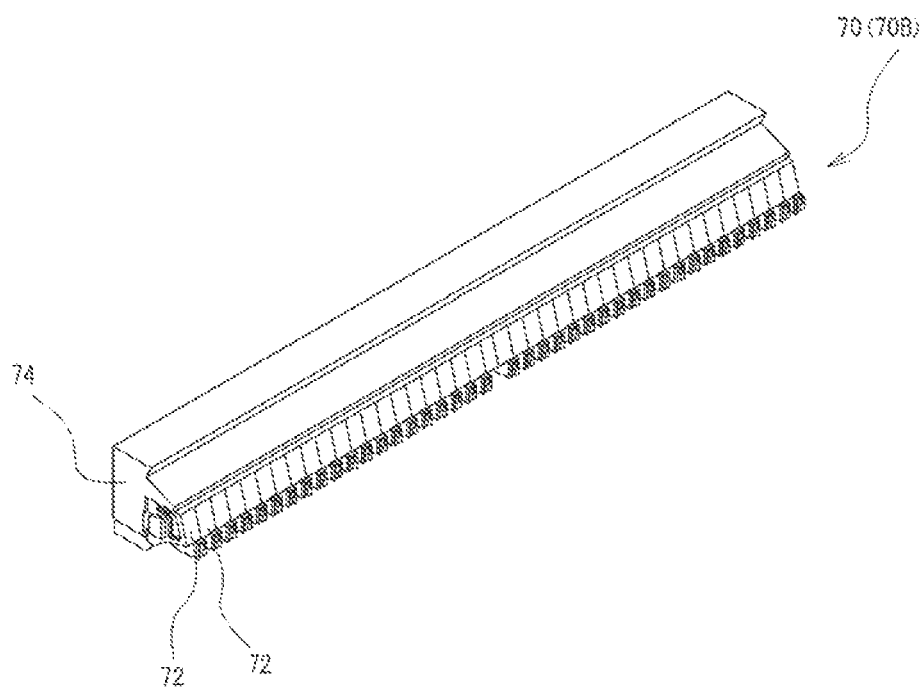
FIG. 10 is a schematic view (perspective view) illustrating another example of the stationary granulating blade of the granulator illustrated in FIG. 1.
Figure 11:
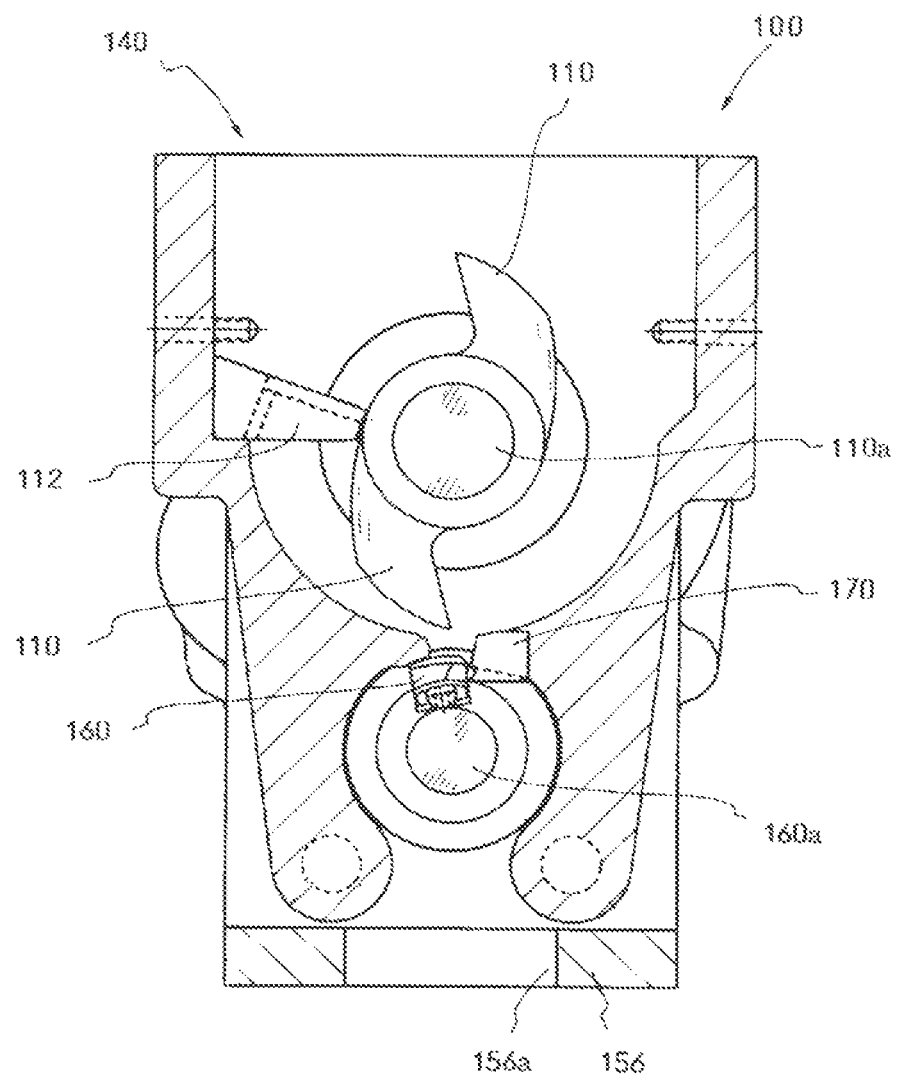
FIG. 11 is a schematic view (cross sectional view) illustrating an example of a granulator according to a conventional embodiment.

In contrast, in the stationary granulating blade 70, as the stationary granulating blade 70A illustrated in FIGS. 7, 9A, and 9B, the shearing blades 72 provided in parallel are formed integrally. As a modification, the shearing blades 72 provided in parallel may be formed as separate bodies and may be fixed to a fixed blade holder 74 via bolts 78 using a chip holder 76 as the stationary granulating blade 70B illustrated in FIGS. 7 and 10. As in the conventional embodiment, the preferable structure may be set as appropriate according to the quality of the material of the object to be processed (resin material).

When granulation is performed by the movable granulating blade 60A and the stationary granulating blade 70A illustrated in the above structure, the movable granulating blade 60A is engaged with the stationary granulating blade 70A by causing the blade edge parts 62a of the shearing blades 62 of the movable granulating blade 60A to enter groove parts 72b of the shearing blades 72 of the stationary granulating blade 70A and causing blade edge parts 72a of the shearing blades 72 of the stationary granulating blade 70A to enter groove parts 62b of the shearing blades 62 of the movable granulating blade 60A. The basic structures and the basic granulating action of the shearing blades 62 and 72 are the same as the structure illustrated in PTL 2.

Next, the structure in which the movable blade holder 64 is fixed detachably to the holder mounting part 22 of the oscillating shaft 20 will be described.

First, as illustrated in FIG. 7, both ends of the oscillating shaft 20 are pivotably supported and fixed by the fixed side plates 50 and 51 of the main body 40 via bearings 36 and 36 and nuts 38 and 38.

In the oscillating shaft 20, the holder mounting part 22 includes a placement surface 22a and a mounting wall 22b, which are two planes (not limited to complete planes and includes partial planes) having L-shaped cross sections orthogonal to the shaft direction. In this case, the wall surface of the mounting wall 22b extends in a direction crossing the oscillating direction (circumferential direction of the shaft) of the oscillating shaft 20. In addition, the front end portion of the placement surface 22a facing the stationary granulating blade 70 is provided with a holder lock groove 22c notched from the front end of the placement surface 22a to the lower rear diagonally.

In contrast, the movable blade holder 64 includes a bottom surface 64a and a back wall 64b, which are two planes (not limited to complete planes and includes partial planes) having L-shaped cross sections orthogonal to the shaft direction in the disposition in which the movable blade holder 64 is attached to the oscillating shaft 20. In addition, the front end portion of the movable blade holder 64 is provided with a lock projection 64c so as to be locked to the holder lock groove 22c of the holder mounting part 22.

Accordingly, when the movable blade holder 64 is mounted in a predetermined position in the holder mounting part 22, the bottom surface 64a (part or all of the surface) of the movable blade holder 64 makes contact with the placement surface 22a (part or all of the surface) of the holder mounting part 22 and the lock projection 64c of the movable blade holder 64 is locked to the holder lock groove 22c of the holder mounting part 22. In this case, the back wall 64b of the movable blade holder 64 faces the mounting wall 22b of the holder mounting part 22 with a predetermined clearance. This makes the lock between the lock projection 64c and the holder lock groove 22c effective. However, the invention is not limited to this structure and the back wall 64b may make contact with the mounting wall 22b.

Since this can support the force acting on the movable blade holder 64 by the holder lock groove 22c in the front end portion of the holder mounting part 22 when performing granulation by causing the oscillating shaft 20 to oscillate and the movable granulating blade 60 to make slidable contact with the stationary granulating blade 70, the mounting strength of the movable blade holder 64 can be improved, thereby increasing the durable load. As a modification, the force acting on the movable blade holder 64 may be supported by the mounting wall 22b of the rear end portion by bringing the back wall 64b into contact with the mounting wall 22b as described above or this may be used together.

The movable blade holder 64 is fixed to the oscillating shaft 20 (holder mounting part 22) via fixing bolts 18. More specifically, in the mounting wall 22b of the holder mounting part 22, bolt holes 22e through which the fixing bolts 18 pass are provided horizontally as through holes. The fixing bolts 18 pass through the bolt holes 22e to fix the movable blade holder 64 to the oscillating shaft 20, that is, the holder mounting part 22.

In addition, as illustrated in FIG. 7, one end side of the holder mounting part 22 is provided with a fixing wall 22d in contact with one end side of the movable blade holder 64 and the other end side is provided with a slide fitting 26 that moves toward or away from the other end side of the movable blade holder 64. In the embodiment, a second shaft cover 34 is fitted to the outer periphery position of the portion in which the fixing wall 22d is formed and fixation is made so as to disable movement in the shaft direction.

The slide fitting 26 is locked to a slide collar 30 fixed to a bolt 28 screwed with the other end of the oscillating shaft 20. That is, when the bolt 28 rotates, the slide collar 30 moves in the shaft direction and the slide fitting 26 locked to the slide collar 30 moves in the shaft direction. For example, when the bolt 28 rotates so as to be tightened, the slide fitting 26 moves toward the fixing wall 22d of the holder mounting part 22 and the second shaft cover 34. When the bolt 28 rotates so as to be loosened, the slide fitting 26 moves away from the fixing wall 22d of the holder mounting part 22 and the second shaft cover 34. In the embodiment, the slide collar 30 is locked to the slide fitting 26 by a retaining ring 32.

The embodiment further includes a first shaft cover 24 locked to the slide fitting 26. Accordingly, the first shaft cover 24 moves as the slide fitting 26 moves. Therefore, when the bolt 28 moves so as to be tightened, the slide fitting 26 and the first shaft cover 24 locked to the slide fitting 26 move toward the fixing wall 22d of the holder mounting part 22 and the second shaft cover 34.

As a result of the movement described above, the movable blade holder 64 is held between the first shaft cover 24 and the fixation part to restrict movement in the shaft direction. The fixation part in the embodiment is the end surface (end surface facing the first shaft cover 24) of the second shaft cover 34. However, the invention is not limited to this structure. The structure in which the fixing wall 22d is used as the fixation part is allowed as another example (not illustrated). In addition, the structure in which the first shaft cover 24 is not provided and the movable blade holder 64 is directly held between the slide fitting 26 and the fixation part to restrict the movement in the shaft direction is allowed as still another example (not illustrated).

When the slide fitting 26 is moved toward the movable blade holder 64 (toward the fixing wall 22d and the second shaft cover 34) by rotating the bolt 28, the movable blade holder 64 is pushed by the first shaft cover 24, held between the first shaft cover 24 and the fixation part, and accurately positioned and fixed in a predetermined location in the shaft direction in the holder mounting part 22 of the oscillating shaft 20. Since no clearance is present at both ends in shaft direction of the movable blade holder 64 at this time, the positional deviation or rattles of the movable granulating blade 60 during granulate work can be prevented.

In contrast, when the slide fitting 26 is moved away from the movable blade holder 64 (away from the fixing wall 22d and the second shaft cover 34) by rotating the bolt 28, the state in which the movable blade holder 64 is held between the first shaft cover 24 and the fixation part is released and the movable blade holder 64 can be moved in the shaft direction. That is, since a clearance is generated at both ends in the shaft direction of the movable blade holder 64, the movable blade holder 64 can be easily removed from the holder mounting part 22 of the oscillating shaft 20.

Figure 12:
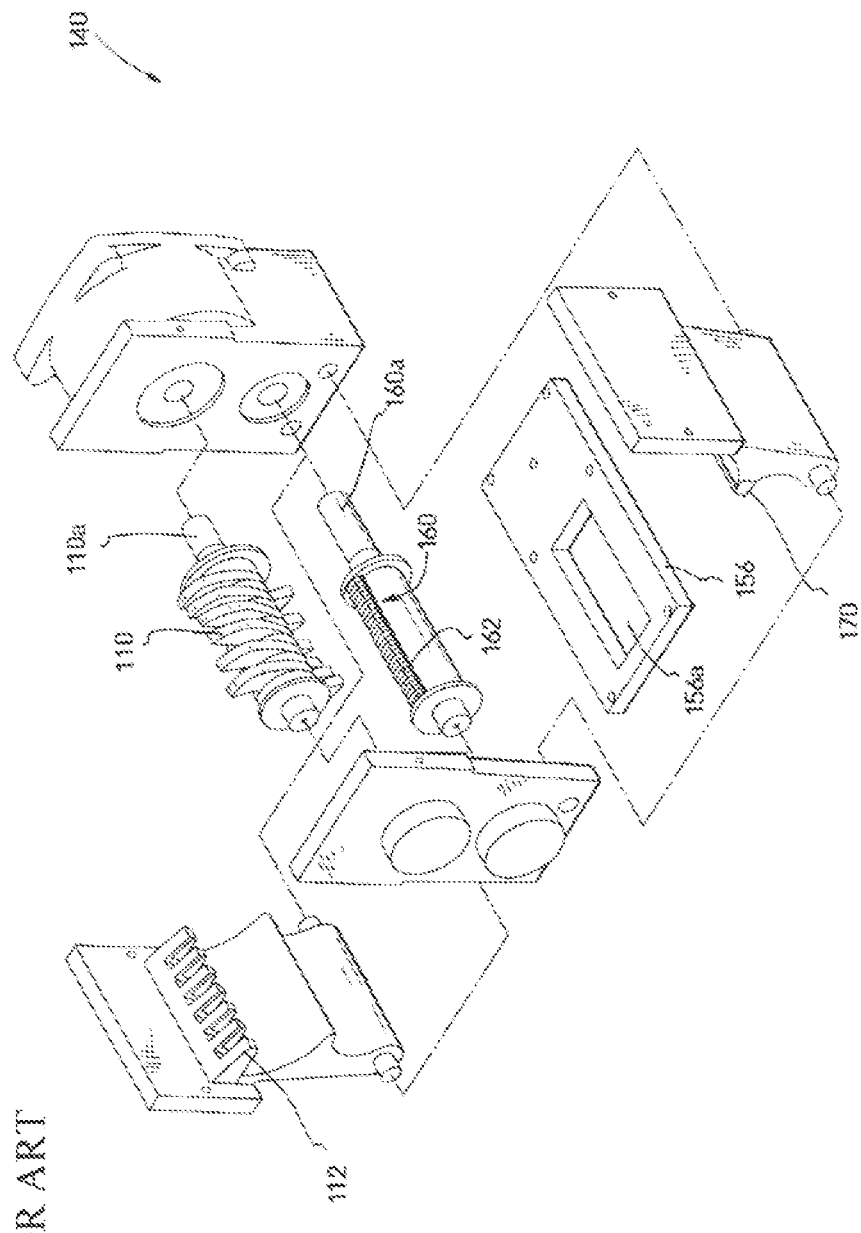
FIG. 12 is an assembly diagram (perspective view) illustrating an example of a main body of the granulator illustrated in FIG. 11.

Conventionally, when the movable granulating blade 60 needs to be replaced because, for example, the shearing blade 62 is chipped, the device should be broken down as illustrated in FIG. 12 so that the oscillating shaft is removed from the main body to replace the movable granulating blade, and the replacement work is complicated and very time-consuming. Accordingly, the down time of the device is long, thereby reducing the operational efficiency. However, in the granulator 1 according to the embodiment having the structure described above, since the movable granulating blade 60 is fixed to the movable blade holder 64 detachable to the oscillating shaft 20, it is possible to remove the movable granulating blade 60 only if the movable blade holder 64 is removed from the oscillating shaft 20 without breaking down the main body 40 and removing the oscillating shaft 20. Therefore, the movable granulating blade 60 can be replaced very easily in a very short time. Accordingly, the down time of the device required for the replacement can be reduced significantly.

In addition, the holder mounting part 22 has the structure for improving the strength for receiving a force during granulation. In addition, the holder mounting part 22 has the structure in which the slide fitting 26 that can move toward or away from the movable blade holder 64 is provided to achieve accurate positioning by preventing the positional deviation and rattles of the movable blade holder 64 to be mounted and to facilitate the removal of the movable blade holder 64.

Figure 13:
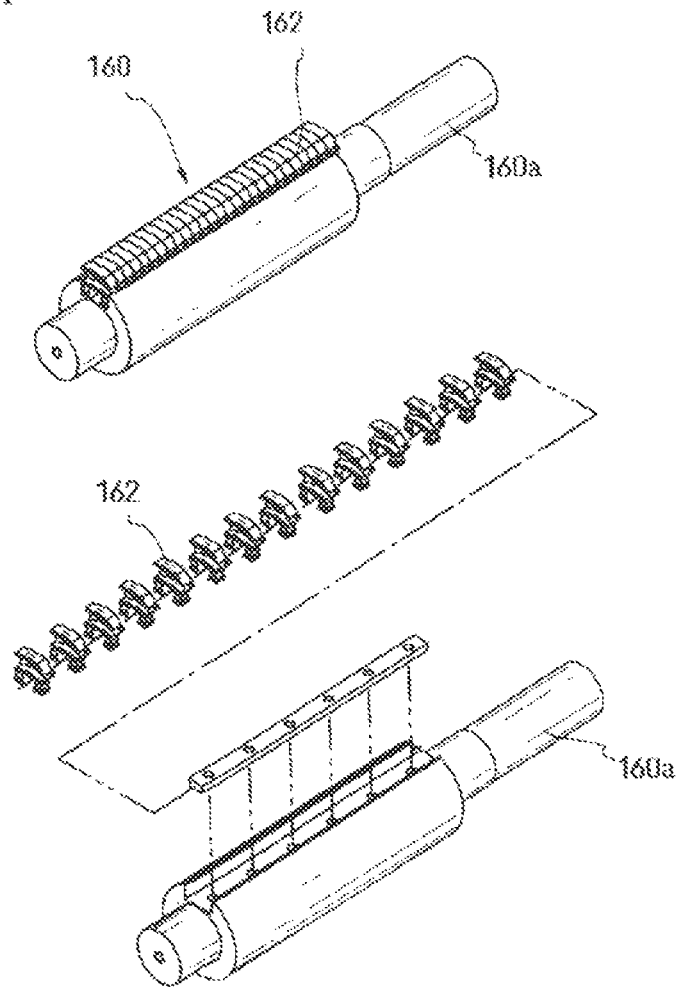
FIG. 13 is a schematic view (perspective view) illustrating an example of a movable granulating blade of the granulator illustrated in FIG. 11.
Figure 14:
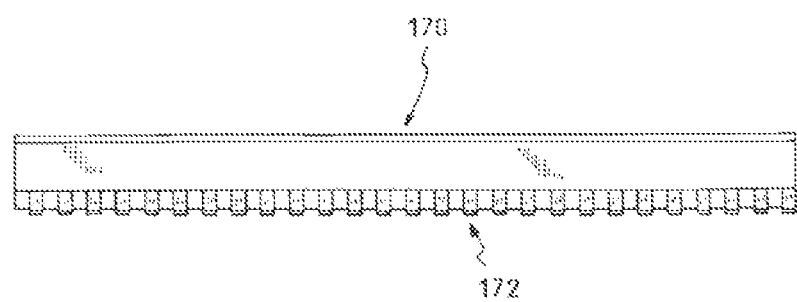
FIG. 14 is a schematic view (perspective view) illustrating an example of a stationary granulating blade of the granulator illustrated in FIG. 11.

In addition, by horizontally passing the fixing bolts 18 for mounting the movable blade holder 64 to the oscillating shaft 20 (holder mounting part 22) through the mounting wall 22b standing in the rear end portion of the holder mounting part 22, the fixing bolts 18 can be removed or attached only by opening the movable side plate 53. Accordingly, as compared with the conventional attachment structure (see FIG. 13) in which fixing bolts are provided at the lower end of the oscillating shaft, the fixing bolts 18 can be removed or attached very easily. Accordingly, the movable blade holder 64 can be attached and removed more easily in a shorter time.

As described above, in the granulator according to the invention, the movable granulating blade can be replaced without breaking down the main body and removing the oscillating shaft. Accordingly, since the movable granulating blade can be replaced very easily in a very short time, the down time of the device required for the replacement can be reduced significantly.

The invention is not limited to the embodiment described above and it will be appreciated that various modifications may be made without departing from the scope of the invention.

What is claimed is:

1. A granulator including
a rotary crushing blade for crushing an object to be processed that has been fed into a main body,
a stationary granulating blade including a plurality of small shearing blades provided in parallel below the rotary crushing blade, and
a movable granulating blade including a plurality of shearing blades provided in parallel below the rotary crushing blade, the movable granulating blade granulating the object to be processed having been coarsely crushed by the rotary crushing blade by engaging the stationary granulating blade by reciprocal driving,
the granulator comprising:
an oscillating shaft pivotably supporting the movable granulating blade so as to be oscillatable in directions in which the movable granulating blade moves toward or away from the stationary granulating blade; and
a driving motor for oscillating the oscillating shaft,
wherein the plurality of shearing blades are provided, in parallel, in the axial direction of the oscillating shaft, the plurality of shearing blades are mounted on a movable blade holder in a state where a chip holder, whose sectional surface in a direction perpendicular to the axial direction is formed into an inverted trapezoid, is inserted through a groove, which is formed in bottom parts of the plurality of shearing blades and whose sectional surface in a direction perpendicular to the axial direction is formed into an inverted trapezoid, a first bolt which is inserted through from a bottom-side of the movable blade holder is fixed to the chip holder, thereby the movable granulating blade is detachably fixed to the movable blade holder,
said movable blade holder includes a bottom surface and a back wall, said bottom surface and back wall being two flat surfaces and whose sectional surfaces in the direction perpendicular to the axial direction are formed into an L-shape, with an engaging projection being provided to a front end part of the bottom surface on the stationary granulating blade-side and projected diagonally downward and backward from the front end,
said oscillating shaft includes a mounting surface and a mounting wall, said mounting surface and mounting wall being two flat surfaces and whose sectional surfaces in the direction perpendicular to the axial direction are formed into an L-shape, a holder engaging groove is formed in a front end part of the mounting surface on the stationary granulating blade-side and formed diagonally downward and backward from the front end,
a second bolt, which is inserted through from a rear side of the mounting wall of the oscillating shaft, is fixed to the back wall of the movable blade holder, in a state where the bottom surface of the movable blade holder contacts the mounting surface of the oscillating shaft and the engaging projection of the movable blade holder engages with the holder engaging groove of the oscillating shaft, and in a state where the back wall of the movable blade holder faces the mounting wall of the oscillating shaft with a predetermined clearance, thereby the movable blade holder is detachably fixed to the oscillating shaft.

2. The granulator according to claim 1,
wherein the oscillating shaft has a holder mounting part to which the movable blade holder is attached,
one end of the holder mounting part is provided with a fixation part in contact with one end of the movable blade holder and
the other end of the holder mounting part is provided with a slide fitting movable toward or away from the other end of the movable blade holder.

3. The granulator according to claim 2,
wherein the slide fitting is locked to a slide collar fixed to a third bolt screwed with the other end of the oscillating shaft and the slide fitting becomes movable in a shaft direction by moving the slide collar in the shaft direction by rotating the third bolt.

4. The granulator according to claim 2, further comprising:
a shaft cover locked to the slide fitting,
wherein the movable blade holder is held between the fixation part and the shaft cover by moving the slide fitting toward the movable blade holder and movement in the shaft direction is restricted.

5. The granulator according to claim 3, further comprising:
a shaft cover locked to the slide fitting,
wherein the movable blade holder is held between the fixation part and the shaft cover by moving the slide fitting toward the movable blade holder and movement in the shaft direction is restricted.

6. The granulator according to claim 2,
wherein the movable blade holder has the back wall standing at a rear end portion opposite to a front end portion facing the stationary granulating blade,
wherein the oscillating shaft has the mounting wall standing so as to face the back wall of the movable blade holder in the holder mounting part, and
wherein the mounting wall is provided with the second bolt hole through which the second bolt for fixing the movable blade holder to the oscillating shaft passes horizontally.

7. The granulator according to claim 3,
wherein the movable blade holder has the back wall standing at a rear end portion opposite to a front end portion facing the stationary granulating blade,
wherein the oscillating shaft has the mounting wall standing so as to face the back wall of the movable blade holder in the holder mounting part, and
wherein the mounting wall is provided with the second bolt hole through which the second bolt for fixing the movable blade holder to the oscillating shaft passes horizontally.

8. The granulator according to claim 4,
wherein the movable blade holder has the back wall standing at a rear end portion opposite to a front end portion facing the stationary granulating blade,
wherein the oscillating shaft has the mounting wall standing so as to face the back wall of the movable blade holder in the holder mounting part, and
wherein the mounting wall is provided with the second bolt hole through which the second bolt for fixing the movable blade holder to the oscillating shaft passes horizontally.

9. The granulator according to claim 5,
wherein the movable blade holder has the back wall standing at a rear end portion opposite to a front end portion facing the stationary granulating blade,
wherein the oscillating shaft has the mounting wall standing so as to face the back wall of the movable blade holder in the holder mounting part, and
wherein the mounting wall is provided with the second bolt hole through which the second bolt for fixing the movable blade holder to the oscillating shaft passes horizontally.

10. The granulator according to claim 1, further comprising a conversion mechanism for converting an output of the driving motor into oscillating motion of the oscillating shaft.

11. The granulator according to claim 1, wherein the driving motor is supported by a driving motor mounting member, the granulator further comprising a conversion mechanism for converting an output of the driving motor into oscillating motion of the oscillating shaft.

* * * * *